United States Patent
Havenga et al.

(10) Patent No.: US 11,416,607 B2
(45) Date of Patent: Aug. 16, 2022

(54) SECURITY RISK INDICATOR AND METHOD THEREFOR

(71) Applicant: DELL PRODUCTS, LP, Round Rock, TX (US)

(72) Inventors: Greg Havenga, Lakeway, TX (US); Ruhull Bhuiyan, Austin, TX (US); Carl McAdams, Round Rock, TX (US); Ibrahim Sayyed, Georgetown, TX (US); Allen Wynn, Round Rock, TX (US); Joshua Alperin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 167 days.

(21) Appl. No.: 16/673,403

(22) Filed: Nov. 4, 2019

(65) Prior Publication Data

US 2021/0133320 A1 May 6, 2021

(51) Int. Cl.
*G06F 3/04847* (2022.01)
*G06F 21/57* (2013.01)
*G06F 21/55* (2013.01)

(52) U.S. Cl.
CPC ........ *G06F 21/554* (2013.01); *G06F 3/04847* (2013.01); *G06F 21/572* (2013.01); *G06F 21/575* (2013.01)

(58) Field of Classification Search
CPC .... G06F 21/554; G06F 21/572; G06F 21/575; G06F 21/31; G06F 21/57; G06F 21/577; G06F 21/55; G06F 21/566; G06F 21/567; G06F 21/44; G06F 21/62; G06F 3/04847; G06F 11/3055; G06F 2201/86
See application file for complete search history.

(56) References Cited

U.S. PATENT DOCUMENTS

| | | | | |
|---|---|---|---|---|
| 8,683,598 | B1 * | 3/2014 | Cashin | H04L 63/20 726/25 |
| 8,782,217 | B1 * | 7/2014 | Arone | H04W 12/37 709/224 |
| 8,911,507 | B1 * | 12/2014 | Gilbert | H04W 12/08 726/35 |
| 8,918,883 | B1 * | 12/2014 | Boyle | H04L 63/1433 726/25 |
| 11,200,065 | B2 * | 12/2021 | Seiler | G06F 21/572 |
| 2005/0235360 | A1 * | 10/2005 | Pearson | H04L 63/1408 726/23 |
| 2006/0059330 | A1 * | 3/2006 | Ong | G06F 9/4416 713/2 |

(Continued)

OTHER PUBLICATIONS

Comcast. "Xfinity Wireless Gateway User Guide", 2010. (Year: 2010).*

*Primary Examiner* — Michael Simitoski
(74) *Attorney, Agent, or Firm* — Larson Newman, LLP (57) ABSTRACT

A method may include determining a configuration of one or more basic input/output system (BIOS) settings identified as influencing security at an information handling system. The method may further include determining a security risk score based on the configuration, and generating a security gauge image that provides a visual indication of the security risk score. The security gauge image may be displayed during BIOS initialization at the information handling system.

20 Claims, 5 Drawing Sheets

(56) References Cited

U.S. PATENT DOCUMENTS

| | | | |
|---|---|---|---|
| 2008/0148387 A1* | 6/2008 | Madina | G06F 9/4411 726/16 |
| 2010/0083381 A1* | 4/2010 | Khosravi | G06F 21/564 726/24 |
| 2010/0169949 A1* | 7/2010 | Rothman | G06F 21/35 726/1 |
| 2011/0225274 A1* | 9/2011 | Dvorkin | G06F 9/44505 709/222 |
| 2012/0017073 A1* | 1/2012 | Gillespie | G06F 9/44505 713/2 |
| 2012/0143650 A1* | 6/2012 | Crowley | H04L 41/28 705/7.28 |
| 2012/0191469 A1* | 7/2012 | Akradi | G16H 50/30 705/2 |
| 2013/0013905 A1* | 1/2013 | Held | G06F 21/575 713/2 |
| 2013/0318600 A1* | 11/2013 | Serrano | G06F 21/00 726/22 |
| 2014/0359777 A1* | 12/2014 | Lam | G06F 21/577 726/25 |
| 2016/0048436 A1* | 2/2016 | Yamazaki | G06F 11/2289 713/2 |
| 2016/0162689 A1* | 6/2016 | Martinez | G06F 9/44505 726/1 |
| 2017/0235662 A1* | 8/2017 | Leask | G06F 11/3616 717/125 |
| 2018/0089425 A1* | 3/2018 | Trikalinou | G06F 21/554 |
| 2018/0158090 A1* | 6/2018 | Glynn | G06Q 30/0203 |
| 2018/0316711 A1* | 11/2018 | Iyer | H04W 12/128 |
| 2018/0322955 A1* | 11/2018 | Sevenster | G06N 20/10 |
| 2019/0207969 A1* | 7/2019 | Brown | G06F 21/552 |
| 2019/0222597 A1* | 7/2019 | Crabtree | H04L 63/1425 |
| 2019/0306182 A1* | 10/2019 | Fry | H04L 67/10 |
| 2020/0073773 A1* | 3/2020 | Liu | G06F 11/328 |

* cited by examiner

| Attribute 401 | Feature Activated 402 | Weight (0-10) 403 | Threat Priority (0-3) 404 | Score (%) 405 | Comment 406 |
|---|---|---|---|---|---|
| Secure Boot | 1 | 5 | 2 | 33 | Potential chance of executing distrusted firmware image |
| HDD Mode (SATA/AHCI/RAID) | 1 | 8 | 3 | 80 | Potential chance of Boot Failure |
| UEFI vs Legacy | 1 | 5 | 1 | 16 | GPT/MBR Partition Informaiton |
| Thunder Bolt | 1 | 6 | 3 | 60 | Enable/configure Thunder Bolt ports |
| USB | 1 | 8 | 1 | 26 | Port enablement for alternative booting |
| WIFI | 1 | 7 | 2 | 47 | Pre-boot wireless network capability |
| Total (Total score / # fields) | | | | 44 | |

Security Vulnerability score = $\dfrac{\text{Feature Activation} * \text{Weight} * \text{Threat Priority} * 100}{\text{Max Weight Value} * \text{Max Threat Value}}$

SECURITY RISK INDICATOR AND METHOD THEREFOR

FIELD OF THE DISCLOSURE

This disclosure generally relates to information handling systems, and more particularly relates to a security risk indicator.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. The software resources include device drivers and firmware that control operation and interoperability of system components.

SUMMARY

A method may include determining a configuration of one or more basic input/output system (BIOS) settings identified as influencing security at an information handling system. The method may further include determining a security risk score based on the configuration, and generating a security gauge image that provides a visual indication of the security risk score. The security gauge image may be displayed during BIOS initialization at the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
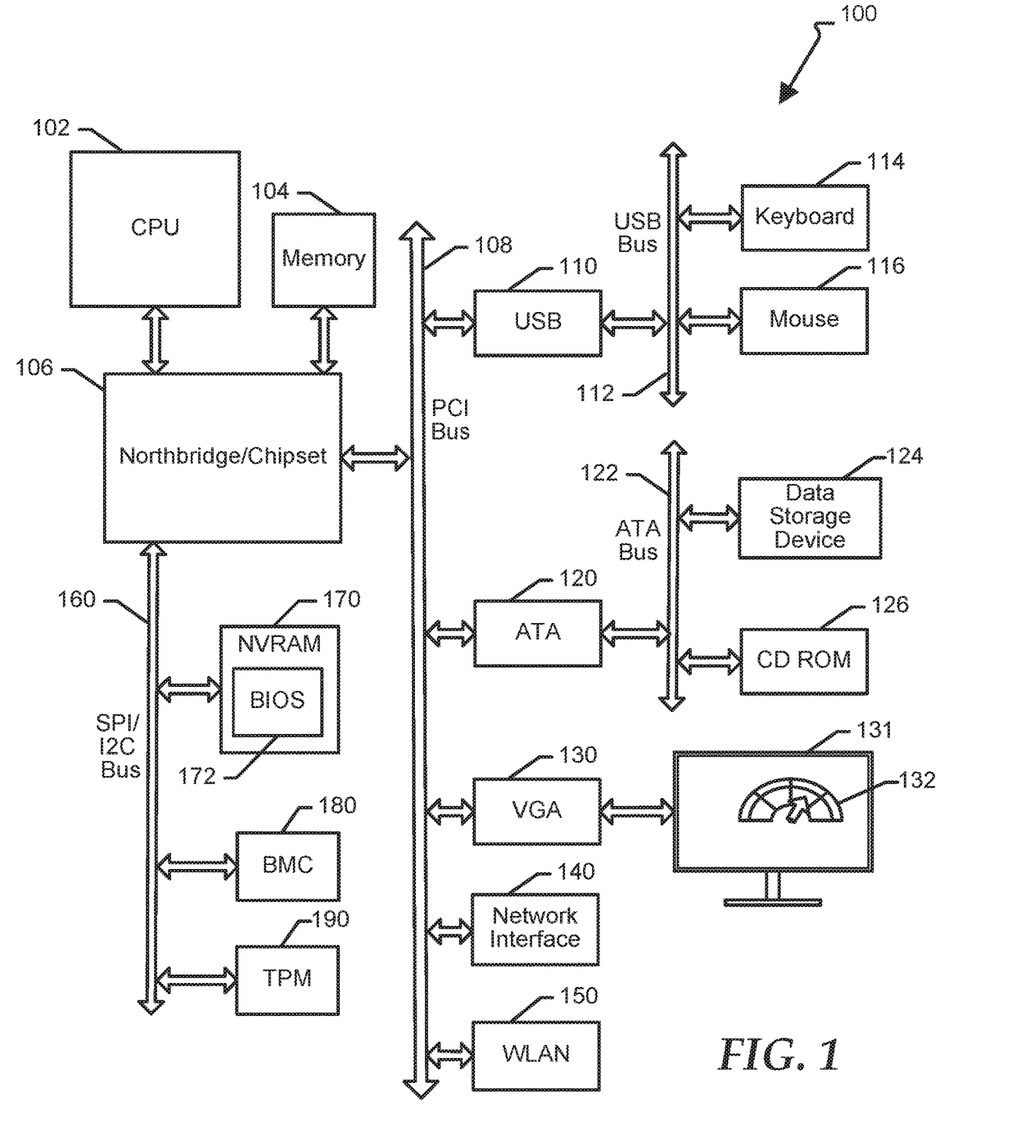
FIG. 1 is a block diagram of an information handling system including a security risk gauge according to an embodiment of the present disclosure.

FIG. 1 illustrates an information handling system 100 including a processor 102, a memory 104, a northbridge/chipset 106, a PCI bus 108, a universal serial bus (USB) controller 110, a USB 112, a keyboard device 114, a mouse device controller 116, an eye-tracking device 118, an ATA bus controller 120, an ATA bus 122, a data storage device 124, a compact disk read only memory (CD ROM) device 126, a video graphics array (VGA) device 130, a display device 131, a network interface controller (NIC) 140, a wireless local area network (WLAN) controller 150, a serial peripheral interface (SPI) bus 160, a NVRAM 170 for storing BIOS 172, a baseboard management controller (BMC) 180, and a trusted platform module (TPM) 190. BIOS 172 and display device 131 are configured to display a security gauge 132 indicating a security risk score during BIOS initialization of information handling system 100.

BMC 180 can be referred to as a service processor, an embedded controller (EC), and the like. BMC 180 includes a processor that can operate out-of-band with respect to CPU 102. For example, remote management systems can utilize BMC 180 to access components at information handling system independent of an operating state of CPU 102. BMC 180 may be responsible for performing low level hardware tasks including thermal management and power management operations. TPM 190 is compliant with an international standard for a secure cryptoprocessor, a dedicated microcontroller designed to secure hardware through integrated cryptographic keys. NVRAM 170 can be referred to as a SPI flash storage device, BIOS SPI, and the like.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and OS to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device. In an embodiment, BIOS 172 can provide one or more runtime processes or device drivers that are configured to support functionality disclosed herein. After the initialization procedure is complete and an operating system, such as Windows, is loaded, computational operation of information handling system can begin.

In an embodiment, the BIOS 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

An information handling system typically includes software and/or hardware components that are configured to prevent a malicious individual or software program from gaining access to the system. For example, TPM 190 can be configured to validate system firmware prior to executing the firmware during system initialization. For another example, the UEFI Secure Boot protocol can secure the boot process by preventing the loading of drivers or OS loaders that are not signed with an acceptable digital signature. In some scenarios, a malicious attack may begin by disabling such devices and protocols. Furthermore, other system configuration options can increase the vulnerability of an information handling system to a malicious attack. For example, configuring BIOS firmware to enable the loading of an operating system from an external data storage device can increase the risk of a malicious entity gaining access to the system.

Techniques described herein can be used to provide a user of an information handling system with a quantitative and qualitative indication of the relative security of their system. In particular, the disclosed techniques include evaluating the configuration of firmware options, analysis of system event logs, and the like, to determine a security score. A security gauge image that provides a visual indication of the security score can be displayed during system initialization. In an embodiment, a user can interact with the security gauge image to identify risk attributes that contributed to the security score and provide the user with an interface to adjust appropriate configuration options to improve system security.

Figure 2:
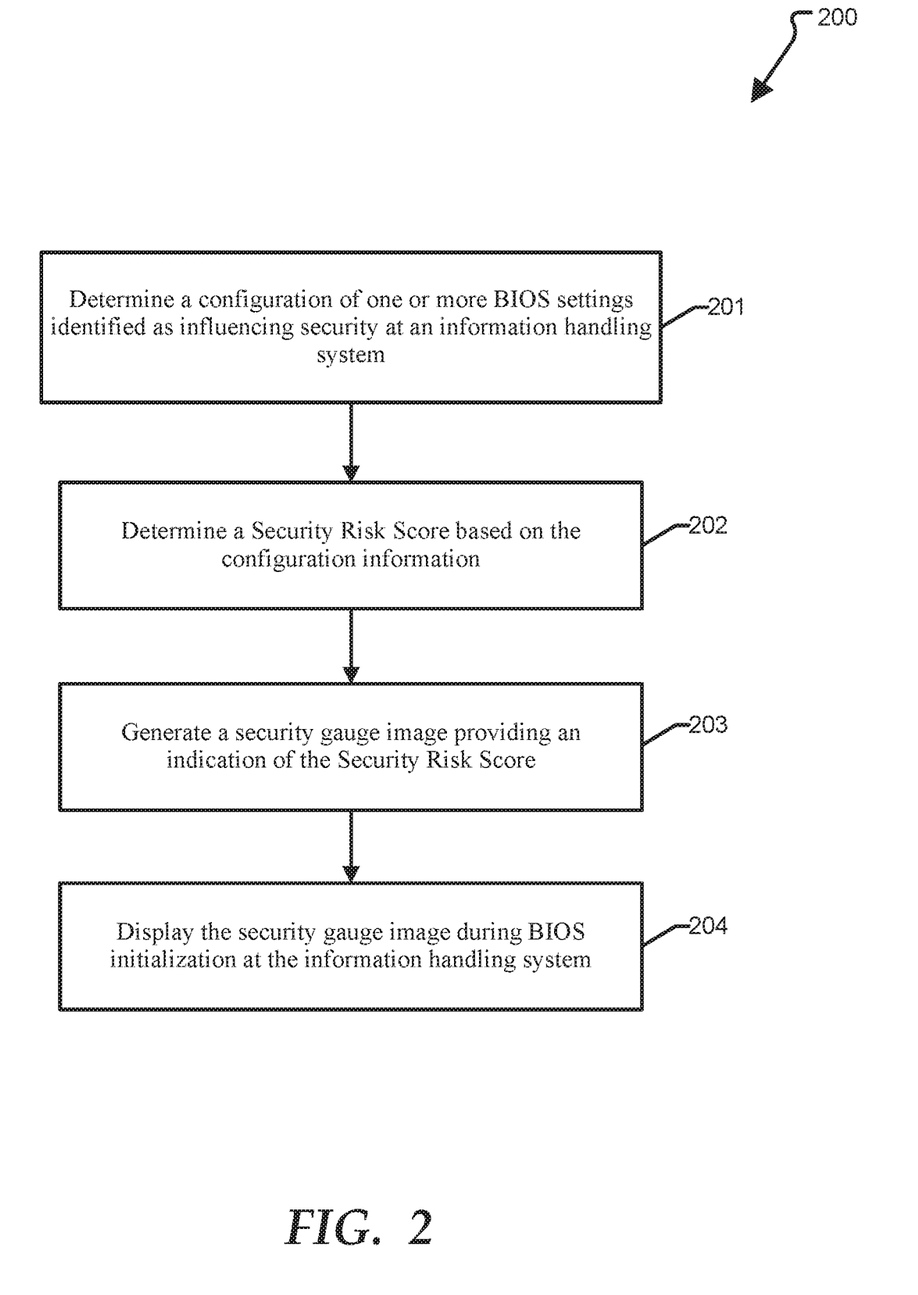
FIG. 2 is flow diagram illustrating a method for generating and displaying a security risk gauge during initialization of an information handling system according to specific embodiment of the present disclosure.

FIG. 2 shows a method 200 for evaluating security vulnerabilities at an information handling system and for displaying a security gauge image during system initialization according to a specific embodiment of the present disclosure. Method 200 begins at block 201 where a configuration of one or more BIOS settings identified as influencing security at an information handling system is determined. In addition to BIOS configuration settings, other configuration information and event logs can be used to evaluate the security or vulnerability at the information handling system. For example, BIOS 172 can include instructions, executed during initialization of information handling system 100, that retrieve the present value of selected system variables stored at NVRAM 170, at a UEFI system partition (ESP), and the like. In an embodiment, the BIOS instructions can implement a table identifying system variables and events that are to be evaluated, a risk-assessment priority associated with each variable or event, and an algorithm to calculate a risk score based on the collected data.

Method 200 continues at block 202 where a security risk score is determined based on the configuration information and based on a security risk algorithm. At block 203, a security gauge image is generated that provides a visual indication of the security risk score. In an embodiment, the security risk score can be translated into a qualitative metric, such as a four-tier scale including regions corresponding to poor, fair, good, and excellent levels of security. The security gauge image can utilize color-coding to further convey a measure of security/vulnerability to a user of information handling system 100. Method 200 completes at block 204 where the security gauge image is displayed during BIOS initialization at the information handling system. For example, the security gauge image can be displayed at an initial BIOS logo screen, at a boot selection screen, at a BIOS setup screen, and the like. In an embodiment, the security gauge image or the security risk score can be communicated to an administration system that is remote to information handling system 100. In another embodiment, a user can interact with the security gauge image, such as by selecting the image using a mouse, touch screen, keyboard hot-key, and the like. In response to the user interaction, BIOS 172 can display information to the user identifying configuration issues contributing to the security risk score, and can further display an interface that enables the user to modify specific system configuration settings so as to improve the score. In a preferred embodiment, program instructions that implement method 200 are included at BIOS 172, thereby protecting the security gauge system itself from a malicious attack. The program instructions can be cryptographically signed to further ensure the integrity of the security score.

Figure 3:
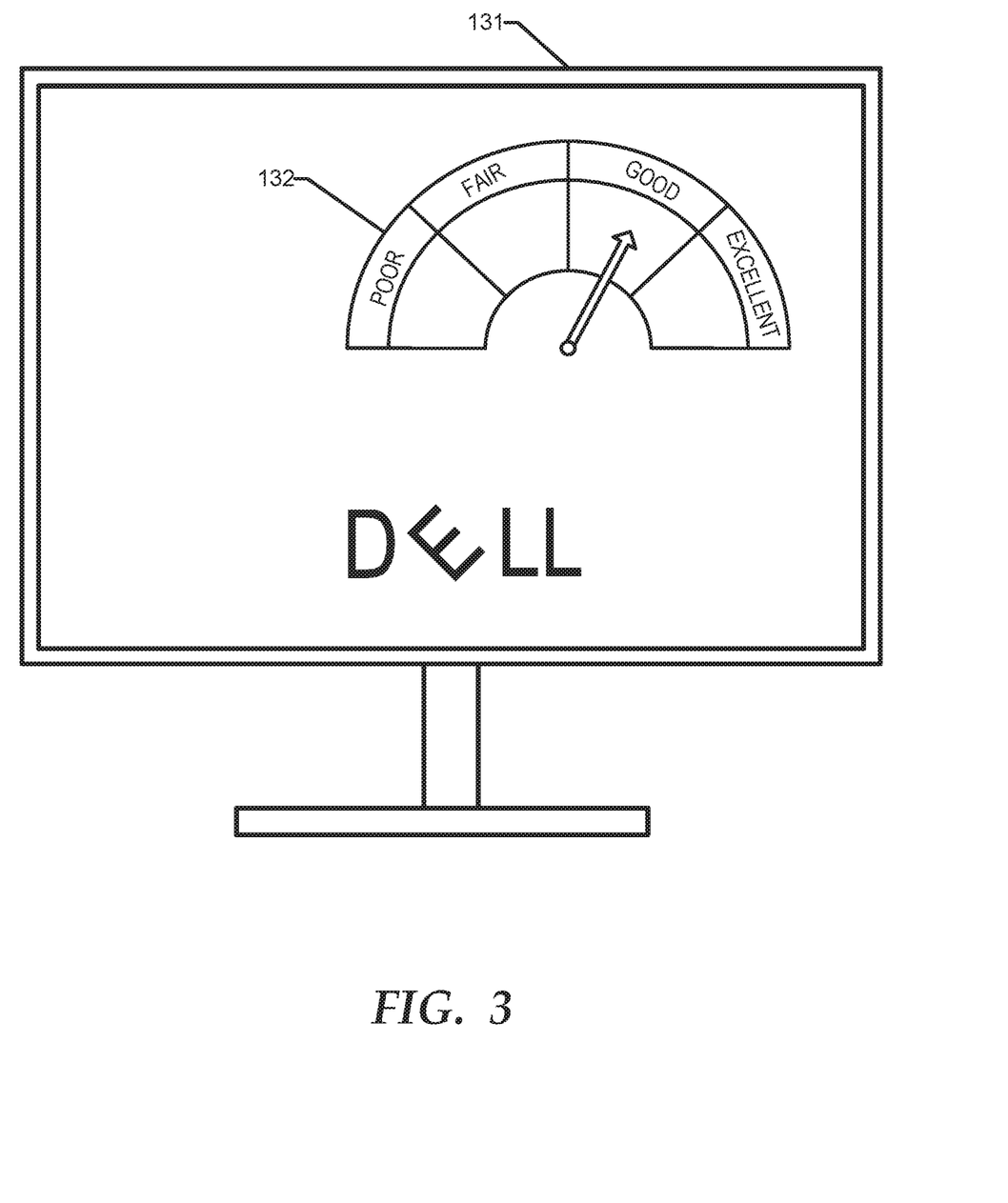
FIG. 3 illustrates a security risk gauge according to specific embodiment of the present disclosure.

FIG. 3 shows a security gauge image 132 according to a specific embodiment of the present disclosure. Security gauge image 132 is intended to provide a simple indication of system security to a user of system 100 and to motivate the user to play an active role in maintaining security at system 100. In a particular embodiment, security gauge image 132 can emulate an analog meter movement including a radial dial and a needle-pointer to indicate a qualitative measure of the calculated security risk score. Image 132 can be provided at display 131 during one or more stages of the boot process at system 100. For example, security gauge image 132 can be shown at an original equipment manufacturer logo screen that is displayed late in a UEFI driver execution (DXE) phase or early boot device selection (BDS) phase. In addition, security gauge image 132 can be displayed at a boot selection configuration screen, at a BIOS configuration setup screen, or during runtime.

In an embodiment, the security gauge image can provide additional information, such as an indication of the type of vulnerability that has been detected. For example, the security gauge image can identify whether the security risk is associated with physical ports, data encryption, and the like. In response to interaction of security gauge image 132 by a user, firmware or runtime instructions can provide an interface to allow the user to adjust system attributes so as to reduce security vulnerabilities identified by the security gauge software. For example, system configuration UEFI boot services or runtime services can be used to alter the state of firmware environment variables, and an updated security risk score and gauge image can be generated. In an embodiment, information displayed to the user in response to interaction with the security gauge image can identify recent changes to the configuration of system 100 that contributed to increased risk. In an embodiment, the user can be encouraged to revert the configuration setting to the previous state.

Figure 4:
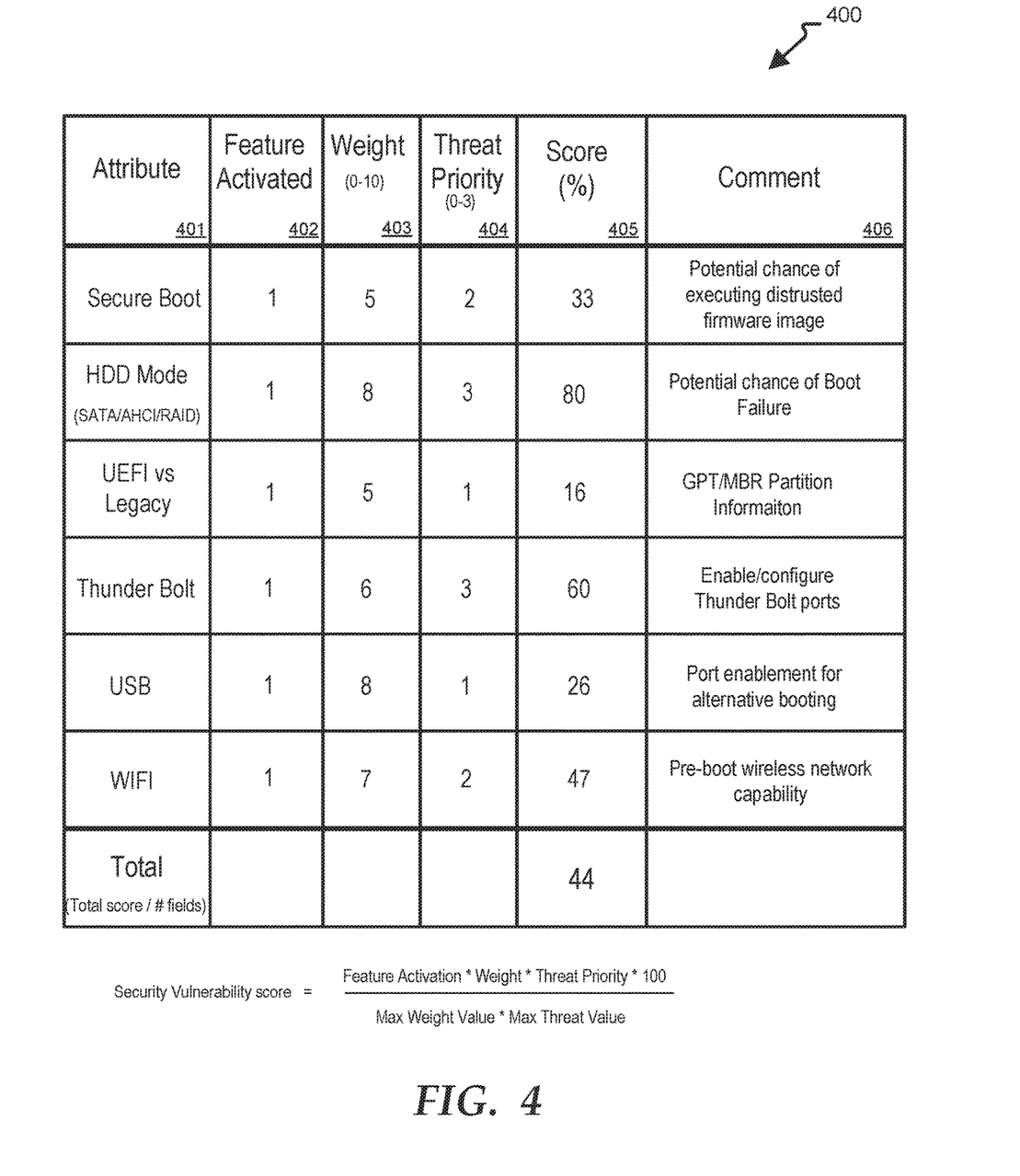
FIG. 4 is a table illustrating risk attributes and parameters used to generate a security risk score according to specific embodiment of the present disclosure.

FIG. 4 shows a table 400 for generating a security risk score according to a specific embodiment of the present disclosure. Table 400 includes column 401 corresponding to a name of a system configuration attribute or event that can be evaluated when generating the security risk score. For the purpose of example, table 400 illustrates six configuration attributes, including "Secure Boot", "HDD Mode", "UEFI vs Legacy BIOS", "Thunder Bolt", "USB", and "WiFi". Configuration or event attributes enumerated at column 401 may correspond to selected BIOS configuration options, selected current or recent events, or a combination thereof. For example, a BIOS configuration variable may indicate that Secure Boot technology is presently disabled, which may make system 100 more vulnerable to a malicious attack. For another example, a risk attribute can include information stored at an event log indicating that the primary operating system has recently been updated.

Column 402 shows a flag indicating whether each configuration attribute feature is activated or disabled, a value of "1" meaning that the feature is activated and a value of "0" indicating that the feature is disabled. Column 403 indicates a weighting factor corresponding to each configuration attribute, for example a value between one and ten. Column 404 indicates a threat priority corresponding to each configuration attribute, for example a value between one and three. Column 405 shows a security risk score corresponding to each configuration attribute. The score can be generated for each attribute based on whether the feature is activated and based on the specified weight and priority values. For example, a score associated with each attribute can be calculated using the equation:

$$\text{Security Vulnerability score} = \frac{\text{Feature Activation} * \text{Weight} * \text{Threat Priority} * 100}{\text{Max Weight Value} * \text{Max Threat Value}}$$

In particular, table 400 shows a risk score associated with the Secure Boot feature having a value of thirty-three:

$$\text{Security Vulnerability score} = \frac{1*5*2*100}{10*3} = 33$$

A total risk score of forty-four can be determined based on an average of each attribute score:

$$\text{Security Risk Score} = \frac{33+80+16+60+26+47}{6} = 44$$

Column 406 provides a comment or summary of the risk associated with each attribute. One of skill will appreciate that the specific attributes and algorithm illustrated at table 400 are but one example of how a security risk score can be determined. Other attributes, factors, and algorithms can be utilized to generate the risk score without departing from the scope of the present disclosure. It will be further appreciated that table 400 and corresponding security risk scores can be defined to provide either a measure of system security realized through analysis of best-practices wherein a higher score indicates greater security, or a measure of vulnerability wherein a higher score indicates less security. In either case, the total security risk score can be translated into a qualitative measure for presentation using security gauge image 132.

The security/risk attributes, priority values, and algorithm illustrated at table 400 can be updated, for example when updating BIOS 172. While an OEM may reserve control over operating details of method 200, a client or an individual user of information handling system 100 may be given access to configuring the attributes and algorithm used to calculate the security score.

Figure 5:
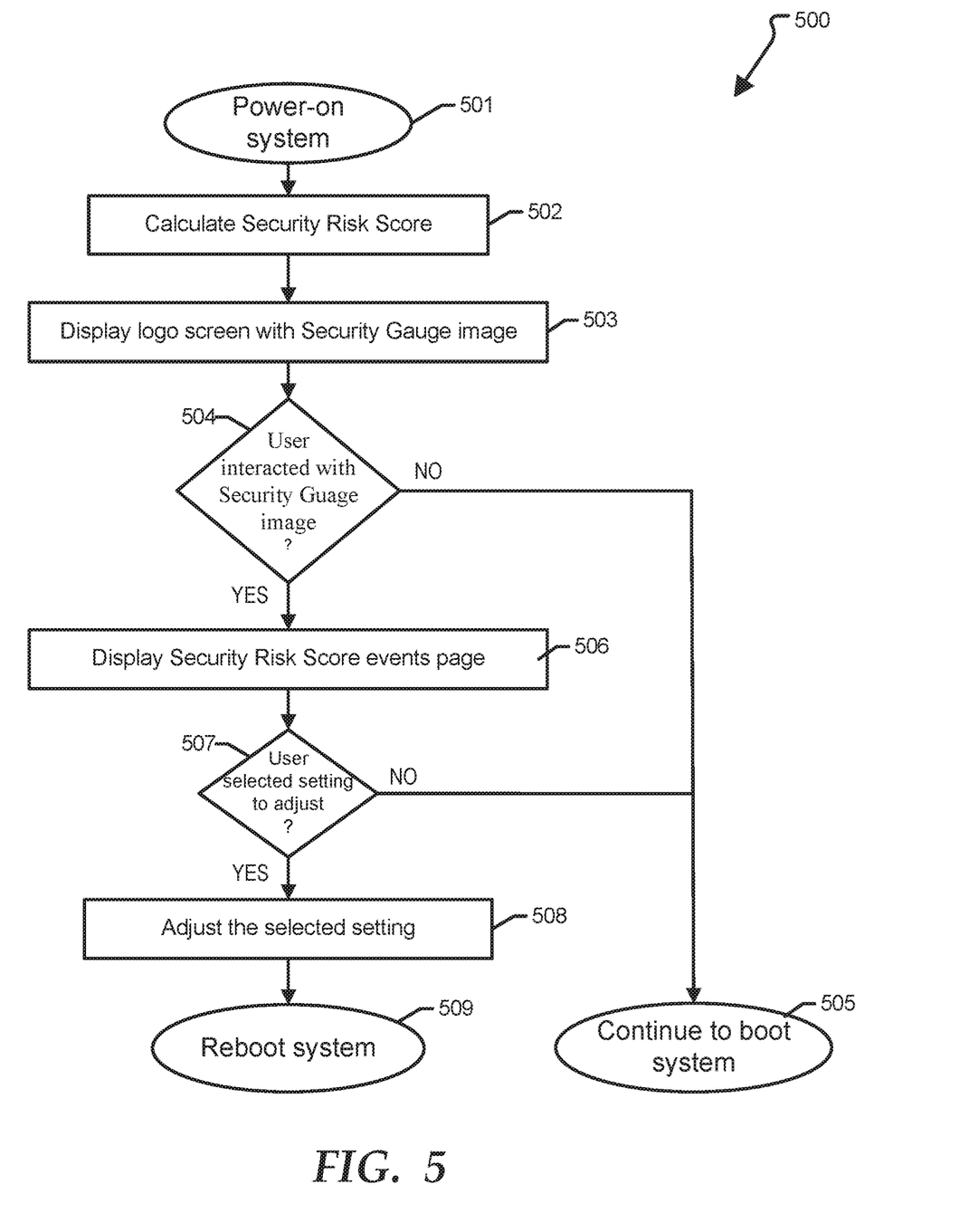
FIG. 5 is a flow diagram illustrating a method for interacting with the security gauge image of FIG. 3, according to s specific embodiment of the present disclosure.

FIG. 5 shows a method 500 for interacting with security gauge image 132 according to s specific embodiment of the present disclosure. Method 500 begins at block 501 where an information handling system is energized and initialized by executing BIOS 172. At block 502, a security risk score is generated based on selected risk attributes and an associated algorithm. For example, BIOS 172 can include instructions configured to implement the security analysis algorithm illustrated at table 400 of FIG. 4. At block 503, the security score is translated into a security gauge image and the image is displayed during BIOS initialization of system 100. At decision block 504, method 500 includes determining whether a user of system 100 has interacted with the security gauge image, such as by clicking on the image using a mouse. If the user has not interacted with the gauge image, method 500 proceeds to block 505 where system 100 continues to boot, culminating system initialization with the loading of an operating system. If however a user has interacted with the gauge image, method 500 continues at block 506 where a security score events page is displayed. For example, the events page can include table 400 or a similar display of the attributes and associated information used to calculate the security score. The events page can include information, such as the comments shown at table 400 that explains the risk and benefit of each risk attribute to the user.

Method 500 proceeds to decision block 507 where it is determined whether the user has elected to adjust one or more configuration settings corresponding to risk attributes shown at the events page. If the user has not elected to modify a present setting, method 500 proceeds to block 505 where system 100 continues to boot. If however the user has elected to adjust one or more configuration settings, method 500 continues at block 508 where the user is provided with an interface to facilitate the adjustment. After the user completes all desired configuration adjustments, method 500 completes at block 509 where a re-boot of system 100 is initiated so that the updated configuration settings can be utilized. During initialization, an updated security score can be generated and a revised security gauge can be generated and displayed. In an embodiment system 100 can be configured to terminate initialization if the security risk indicated by the security score exceeds a predetermined level.

Referring back to FIG. 1, information handling system 100 can include additional components and additional buses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display.

Information handling system 100 can include a set of instructions that can be executed to cause the information handling system to perform any one or more of the methods or computer based functions disclosed herein. Information handling system 100 may operate as a standalone device or may be connected to other computer systems or peripheral devices, such as by a network.

In a networked deployment, information handling system 100 may operate in the capacity of a server or as a client user computer in a server-client user network environment, or as a peer computer system in a peer-to-peer (or distributed) network environment. Information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a display device; and
   a basic input/output system (BIOS) configured to:
      determine a configuration of one or more activated BIOS settings identified as influencing security at the information handling system;
      determine a security risk score based on the configuration of the one or more activated BIOS settings according to at least one recent event at an event log;
      generate a security gauge image providing a visual indication of the security risk score;
      display the security gauge image at the display device during BIOS initialization at the information handling system, wherein the security gauge image allows for user interaction;
      determine whether a user interacted with the security gauge image displayed during BIOS initialization;
      in response to a determination that the user interacted with the security gauge image, provide an interface to update a value of the configuration of the one or more activated BIOS settings;
      determine whether the user updated the value of the configuration of the one or more activated BIOS settings via the interface; and
      in response to another determination that the user updated the configuration of the one or more activated BIOS settings, reboot the information handling system, wherein a revised security gauge image is generated and displayed based on a revised security risk score.

2. The information handling system of claim 1, wherein the BIOS is further to:
   receive the event log identifying system events identified as influencing security at the information handling system; and
   determine the security risk score further based on the system events.

3. The information handling system of claim 1, wherein determining the security risk score further comprises identifying a threat priority associated with the configuration of each of the one or more activated BIOS settings.

4. The information handling system of claim 1, wherein the BIOS is further configured to:
   display information identifying the configuration of the one or more activated BIOS settings contributing to the security risk score.

5. The information handling system of claim 1, wherein the security risk score is based on the value of the configuration of the one or more activated BIOS settings.

6. The information handling system of claim 1, wherein a first setting of the one or more activated BIOS settings comprises a configuration of a trusted platform module.

7. The information handling system of claim 1, wherein a first setting of the one or more activated BIOS settings comprises a configuration of a Secure Boot protocol.

8. The information handling system of claim 1, wherein a first setting of the one or more activated BIOS settings comprises a configuration of a removable storage device.

9. The information handling system of claim 1, wherein a first setting of the one or more activated BIOS settings comprises a prior or pending BIOS image update event.

10. The information handling system of claim 1, wherein the security gauge image is displayed at a driver execution phase.

11. The information handling system of claim 1, wherein the BIOS is further configured to transmit an alert to a remote administration service in response to determining that a threat level indicated by the security risk score exceeds a predetermined threshold.

12. A method comprising:
    determining a configuration of one or more basic input/output system (BIOS) settings identified as influencing security at an information handling system;
    determining a security risk score based on the configuration of the one or more activated BIOS settings according to at least one recent event an an event log;
    generating a security gauge image providing a visual indication of the security risk score;
    displaying the security gauge image at a display device during BIOS initialization of the information handling system, wherein the security gauge image allows for user interaction;
    determining whether a user interacted with the security gauge image displayed during BIOS initialization;
    in response to determining that the user interacted with the security gauge image, providing an interface to update a value of the configuration of the one or more activated BIOS settings;
    determining whether the user updated the value of the configuration of the one or more activated BIOS settings via the interface; and
    in response to determining that the user updated the configuration of the one or more activated BIOS settings, rebooting the information handling system, wherein a revised security gauge image is generated and displayed based on a revised security risk score.

13. The method of claim 12, further comprising:
    receiving the event log identifying system events identified as influencing security at the information handling system; and
    determining the security risk score further based on the system events.

14. The method of claim 12, wherein determining the security risk score further comprises identifying a threat priority associated with the configuration of each of the one or more activated BIOS settings.

15. The method of claim 12,
    wherein the interface includes information identifying the configuration of the one or more activated BIOS settings contributing to the security risk score.

16. The method of claim 12, wherein the security risk score is based on the value of the configuration of the one or more activated BIOS settings.

17. The method of claim 12, wherein a first setting of the one or more activated BIOS settings comprises a configuration of a trusted platform module.

18. The method of claim 12, wherein a first setting of the one or more activated BIOS settings comprises a configuration of a Secure Boot protocol.

19. The method of claim 12, further comprising transmitting an alert to a remote administration service in response to determining that a threat level indicated by the security risk score exceeds a predetermined threshold.

20. A method comprising:
   determining a configuration of one or more basic input/output system (BIOS) settings identified as influencing security at an information handling system;
   determining a security risk score based on the configuration of the one or more activated BIOS settings according to a recent event in an event log;
   generating a security gauge image providing a visual indication of the security risk score;
   displaying the security gauge image during BIOS initialization at the information handling system, wherein the security gauge image allows for user interaction;
   determining whether a user interacted with the security gauge image displayed during BIOS initialization;
   in response to the determining that the user interacted with the security gauge image, display an interface to update a value of the configuration of the one or more activated BIOS settings contributing to the security risk score;
   determining whether the user updated the value of the configuration of the one or more activated BIOS settings via the interface; and
   in response to the determining that the user updated the configuration of the one or more activated BIOS settings, rebooting the information handling system, wherein a revised security gauge image is generated and displayed based on a revised security risk score.

* * * * *